United States Patent [19]

Yamashita et al.

[11] Patent Number: 5,529,140
[45] Date of Patent: Jun. 25, 1996

[54] TRACTION CONTROL SYSTEM FOR MOTOR VEHICLE

[75] Inventors: Tetsuhiro Yamashita, Hiroshima; Koji Hirai, Hatsukaichi, both of Japan

[73] Assignee: Mazda Motor Corporation, Hiroshima-ken, Japan

[21] Appl. No.: 274,881

[22] Filed: Jul. 14, 1994

[30] Foreign Application Priority Data

Jul. 23, 1993 [JP] Japan .................... 5-202566

[51] Int. Cl.$^6$ ............................... B60K 28/16
[52] U.S. Cl. .................... 180/197; 364/426.03
[58] Field of Search .............. 180/197; 364/426.02, 364/426.01, 426.03; 123/396, 1 A

[56] References Cited

U.S. PATENT DOCUMENTS 4,985,837  1/1991  Togai et al. .................... 180/197 X
5,335,744  8/1994  Takasuka et al. ................ 180/197

FOREIGN PATENT DOCUMENTS 5-1613  1/1993  Japan.

Primary Examiner—Margaret A. Focarino
Assistant Examiner—Victor E. Johnson
Attorney, Agent, or Firm—Keck, Mahin & Cate

[57] ABSTRACT

A traction control system for a motor vehicle has an engine with a catalytic converter in an exhaust path. The traction control system has wheel speed sensors for detecting wheel speeds of respective wheels, a slip amount detection device for calculating slip amounts in driven wheels based on the wheel speeds, an engine output controller for decreasing engine output based on predetermined engine output decreasing patterns which correspond to the slip amounts, and an octane number detection device for detecting a difference in octane numbers of fuel between fuel designated in the engine and fuel actually supplied to the engine. The engine output decreasing pattern is changed so as to decrease unburned hydrocarbons in the exhaust gas flown into the catalytic converter when the octane number of the actually supplied fuel is more than a predetermined number smaller than that of the designated fuel.

20 Claims, 5 Drawing Sheets

TRACTION CONTROL SYSTEM FOR MOTOR VEHICLE

BACKGROUND OF THE INVENTION

1. Field of the Invention

The present invention relates to a traction control system of a motor vehicle, and in particular to a traction control system for a motor vehicle with a catalytic converter in an exhaust path of an engine.

2. Description of Related Art

An excessive driving torque generates a slip in a driven wheel when the acceleration of a vehicle is necessary. When the slip occurs in the driven wheel, the acceleration of the vehicle is decreased. In order to prohibit such decrease of the acceleration, the conventional motor vehicle is provided with a traction control system.

The traction control system decreases the engine output and/or increases the braking force so as to reduce the slip amount in the driven wheel to a predetermined amount, when the excessive slip occurs in the driven wheel. The retard of ignition timing and the fuel cut has been carried out in order to decrease the engine output. That is, the control levels are provided based on the slip amount in the driven wheel, and thereafter the ignition timing is retarded and the fuel cut in the predetermined cylinders is carried out based on the table whose parameter is the control level.

On the other hand, the motor vehicle is provided with a catalytic converter which lowers emission levels of unburned hydrocarbons, carbon monoxide and the like. Where the traction control system decreases the engine output by the retard of ignition timing and the fuel cut when the excessive slip occurs in the driven wheel, the following problems occur.

When the ignition timing is retarded, the amount of unburned hydrocarbons in the exhaust gas relatively increases and the after burning occurs for a long time period which causes the temperature rise of the exhaust gas. Therefore, the oxidation in the catalytic converter becomes active and the temperature of the converter becomes high. As a result, the characteristics of the catalytic converter decreases and the durability of the converter decreases because of the heat deterioration of catalyzer. On the other hand, when the fuel cut is carried out, the hydrocarbons discharged from the cylinders without the fuel cut contact with the thick oxygen in the exhaust gas discharged from the cylinders with the fuel cut before reaching the catalytic converter and have possibility of reburning. As a result, the exhaust gas is heated again which causes the same problems explained above.

In order to resolve such problems explained above, Japanese Patent Laid-Open No. 5-1613 discloses the traction control system for the motor vehicle with the catalytic converter in the exhaust path. According to the traction control system disclosed, when the engine speed is greater than a predetermined speed, the engine output decreasing patterns are shifted from the usual pattern to another pattern by which the temperature of the exhaust gas is forced to be decreased. More specifically, since the intervals of the exhaust gas discharged from the respective cylinders reaching the catalytic converter becomes short at the high speed of the engine, the abnormal temperature rise of the exhaust gas can be avoided and therefore the above-mentioned problems are resolved.

However, there are still problems to be resolved in the conventional traction control system disclosed in Japanese Patent Publication above, as explained below.

There is a motor vehicle in which a high octane number gasoline is to be used for an engine. Among the motor vehicles in which the high octane gasoline is designated, there are vehicles whose engines can be operated safely even if low octane number or normal gasoline is actually used. This is because the control unit of the engine memory is a first ignition timing map for the high octane number gasoline and a second ignition timing map for the regular gasoline in which the ignition timing is provided in a retard direction. Further, the first ignition timing map is usually used, and the first ignition timing map is switched to the second ignition timing map when the knock sensor detects that the regular gasoline has been used.

In a vehicle having such first and second ignition timing maps, suppose that the vehicle is traveling with an engine condition of high load and low engine speed. If the regular gasoline is used, then the ignition timing is controlled by using the second ignition timing map for the regular gasoline in which the ignition timing is provided in a retard direction. If the traction control is started under this condition, the ignition timing is provided in a retard direction by the traction control because the engine speed does not become high. Therefore, the ignition timing is retarded in a large amount by both of the second ignition timing map for the regular gasoline and the traction control. Further, the unburned hydrocarbons in the exhaust gas increase because the fuel amount to be supplied increases under the high load of the engine, the temperature in the exhaust gas increases because the after burning continues for a very long period. As a result, according to both the increase of the hydrocarbons in the exhaust gas and the after burning for the very long period, the temperature of the catalytic converter becomes very high because the oxidation of hydrocarbons becomes very active. Finally, characteristics of the catalytic converter increases and heat deterioration in the catalyzer occurs.

Where the vehicle has an engine with a supercharger such as a turbo-charger or a mechanical supercharger, the same problems occurs when the engine is in the condition of high load and low speed.

That is, when the ignition timing is retarded by the traction control under the condition that the engine has been supercharged, the after burning is promoted and the temperature of the exhaust gas becomes of very high because the large amount of air forced into a combustion chamber of the engine and the oxidation of hydrocarbon in the catalytic converter under the thick oxygen. Therefore, according to both of the high temperature the exhaust gas and the oxidation of hydrocarbon under the thick oxygen, the oxidation of hydrocarbon is abnormally promoted and the temperature of the exhaust becomes extremely high. As a result, the characteristics of the catalytic converter decreases and the heat deterioration of catalyzer occurs even if the engine speed is not so high.

SUMMARY OF THE INVENTION

It is therefore an object of the present invention to provide a traction control system for a motor vehicle having an engine with a catalytic converter in an exhaust path which can both carry out a traction control and protect a catalytic converter effectively.

It is another object of the present invention to provide a traction control system for a motor vehicle which can avoid an excessive temperature rise of a catalytic converter.

These and other objects are achieved according to the present invention in one aspect thereof by providing a traction control system for a motor vehicle having an engine with a catalytic converter in an exhaust path, said system comprising, wheel speed sensors for detecting wheel speeds of respective wheels, slip amount detection means for calculating slip amounts in driven wheels based on the wheel speeds, engine output controlling means for decreasing engine output based on predetermined engine output decreasing patterns which correspond to the slip amounts, means for detecting a difference in octane number of fuel between fuel designated in the engine and fuel actually supplied to the engine, and means for changing the engine output decreasing pattern so as to decrease unburned hydrocarbons in the exhaust gas flown into the catalytic converter when the octane number of the actually supplied fuel is smaller by more than a predetermined number than that of the designated fuel.

These and other objects are also achieved according to the present invention in another aspect thereof by providing a traction control system for a motor vehicle having an engine with a catalytic converter in an exhaust path and a supercharger, said system comprising, wheel speed sensors for detecting wheel speeds of respective wheels, slip amount detection means for calculating slip amounts in driven wheels based on the wheel speeds, engine output controlling means for decreasing engine output based on predetermined engine output decreasing patterns which correspond to the slip amounts, means for detecting supercharged pressure in the engine, and means for changing the engine output decreasing pattern so as to decrease unburned hydrocarbons in the exhaust gas flown into the catalytic converter when the supercharged pressure in the engine is greater than a predetermined value.

The above and other objects and features of the present invention will be apparent from the following description by making reference to accompanying drawings employed for preferred embodiments of the present invention.

DESCRIPTION OF THE PREFERRED EMBODIMENTS

The present invention will now be explained with reference to the preferred embodiments and the drawings.

Figure 1:
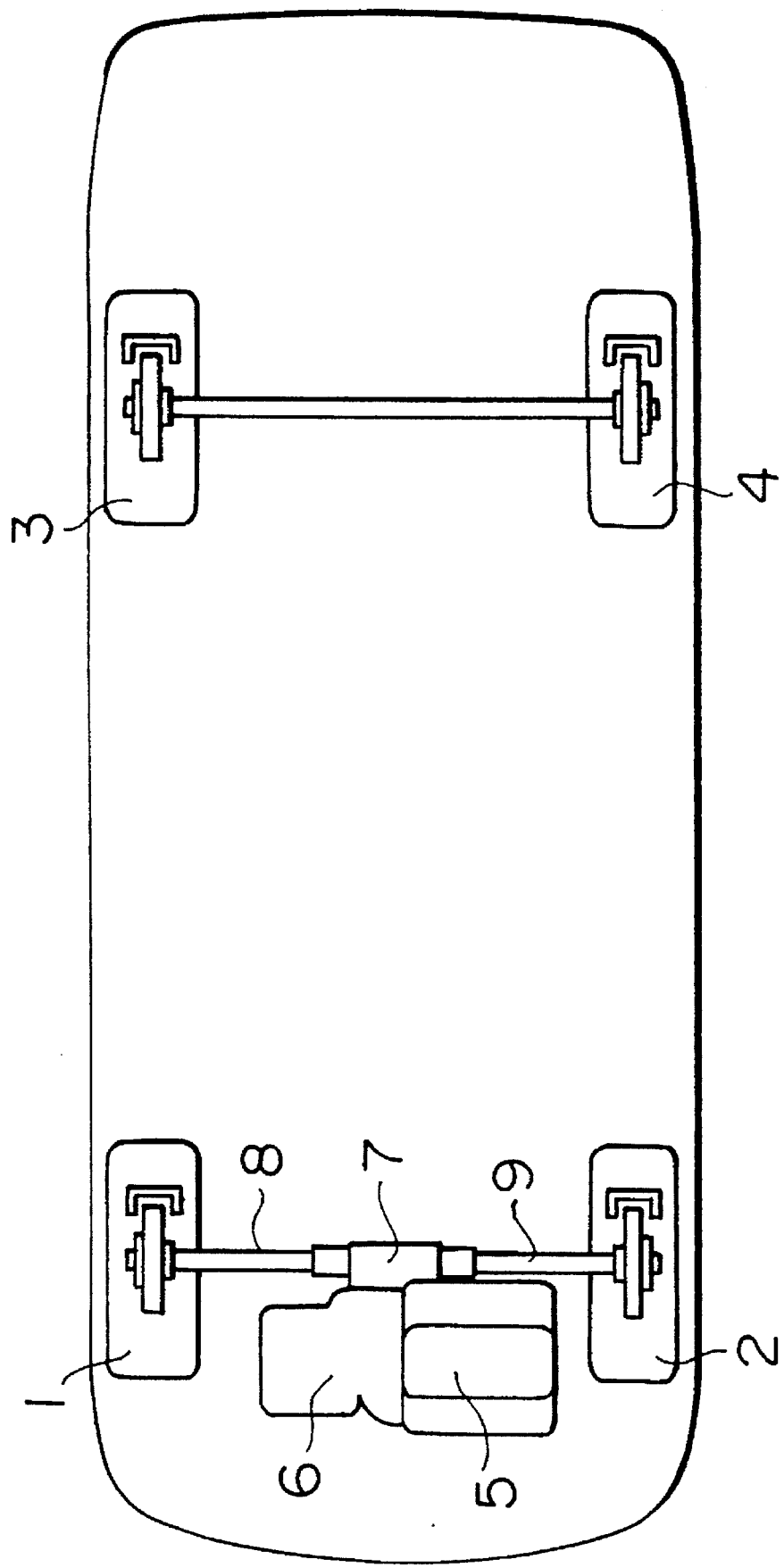
FIG. 1 is a plan view showing the layout of a motor vehicle.

FIG. 1 is a plan view showing the layout of a motor vehicle. Referring to FIG. 1, a motor vehicle has right and left front wheels 1 and 2, for driven wheels, right and left rear wheels 3 and 4 for nondriven wheels, and an engine 5 disposed on the front side thereof. The output of the engine 5 is transmitted to the right and left front wheels 1 and 2 through a transmission 6, a differential gear 7 and right and left driving shafts 8 and 9.

Figure 2:
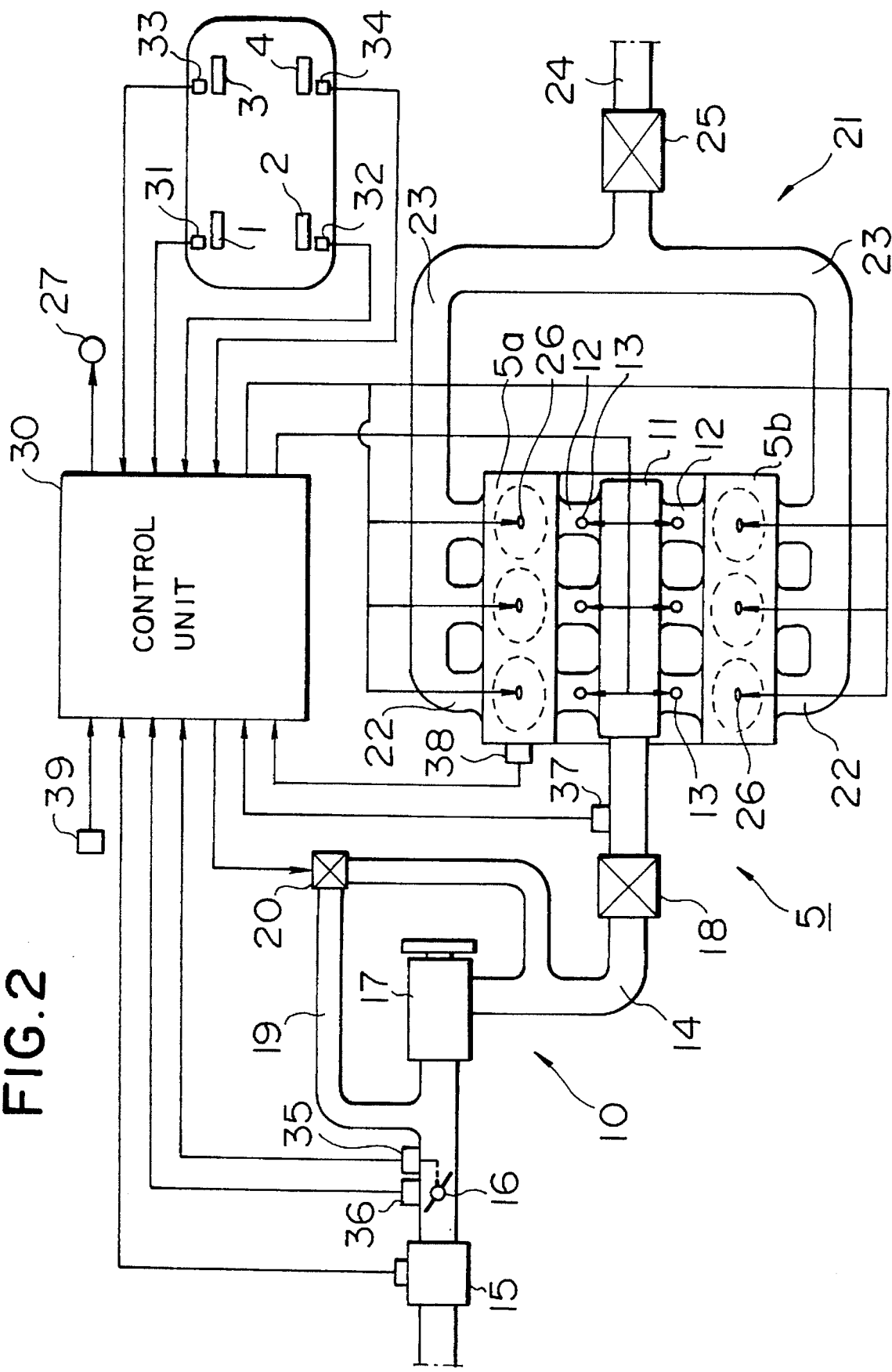
FIG. 2 is a general diagram of a traction control system in accordance with a preferred embodiment of the present invention.

FIG. 2 is a general diagram of a traction control system in accordance with a preferred embodiment of the present invention. As shown in FIG. 2, the engine 5 is a V-type six-cylinder engine with a first bank 5a and a second bank 5b each of which has three cylinders in a line. Six independent intake paths 12 are respectively connected on one end thereof to each of the cylinders of the first and second banks 5a and 5b, and connected on the other end thereof to a surge tank 11 which is one component of an intake path 10, and are provided with respective fuel injection valves 13. A main intake path 14 connected to the surge tank 11 is provided, from the upstream portion thereof, with an air flow sensor 15 for detecting amount of intake air, a throttle valve 16 for controlling the engine output and the intake air amount based on the operation of an accelerator pedal (not shown), a Lysholm-type supercharger 17, and an intercooler 18 for cooling the intake air. A bypass path 19 is provided on the main intake path 14 so as to bypass the supercharger 17, and is provided with an air bypass valve 20 for controlling the intake air amount supercharged by the supercharger 17. Where the air bypass valve 20 is fully closed, the supercharged intake air discharged by the supercharger 17 is directly distributed to the respective cylinders of the engine 5 through the intercooler 18 and the surge tank 11. Where the air bypass valve 20 is opened, one part of the supercharged intake air flows in the reverse direction through the bypass path 19 so that the pressure of the intake air is decreased.

An exhaust path 21 of the engine 5 includes independent exhaust paths 22 connected to the respective cylinders, two collecting exhaust paths 23 for collecting respective cylinders of the both banks 5a and 5b, and a combining exhaust path 24 for combining the two collecting exhaust paths 23. The combining exhaust path 24 is provided with a catalytic converter 25 for lowering emission levels of unburned hydrocarbons and the like in the exhaust gas.

The vehicle is provided with an electronic control unit 30. The control unit 30 receives wheel speed signals from wheel speed sensors 31–34 detecting wheel speeds of the respective wheels 1–4, an intake air amount signal from the air flow sensor 15, a throttle valve opening signal from a throttle valve opening sensor 35 detecting a throttle valve opening of the throttle valve 16, an idle signal from an idle switch 36 detecting that the throttle valve 16 has been fully closed, an intake air pressure signal from a pressure sensor 37 detecting intake air pressure in the downstream portion of the supercharger 17, a knock signal from a knock sensor 38 detecting knocking such as detonation, an engine speed signal from an engine speed sensor 39 detecting an engine speed and the like. Based on these signals, the control unit 30 controls the ignition timings of ignition plugs 26 attached in the respective cylinders of the both banks 5a and 5b, fuel amounts of the fuel injection valves 13, and the supercharged intake air pressure by operating the air bypass valve 20. The control unit 30 further carries out a traction control where it is determined that predetermined conditions for the traction control has been established. The control unit 30 lights a lamp 27 while the traction control has been carried out.

The control unit 30 carries out the ignition timing control, the fuel injection control and the supercharged intake air pressure control, which will be explained below.

The ignition timing control will be explained. The control unit 30 has a first map for ignition timing for high octane number gasoline whose parameters are the engine speed and the intake air amount, and a second map for ignition timing for regular gasoline in which the ignition timing is retarded slightly more than the first map. The control unit 30 determines an optimum injection timing by applying the engine speed Ne obtained from the engine speed sensor 39 and the intake air amount Q obtained from the air flow sensor 15 to the first map, and then determines a final injection timing by adding the correction amount for the ignition timing calculated based on the signal from the knock sensor 38 to the optimum ignition timing, and finally outputs a control signal for ignition timing so that the ignition plugs 13 are ignited by the final injection timing. Further, the correction amount is further corrected to be retarded shortly after the knock sensor 38 has detected that the knock occurs more than a predetermined times, and the correction amount is gradually corrected to be advanced when the knock does not occur more than the predetermined times for a predetermined period.

The control unit 30 determines that the regular gasoline has been used, then switches to the second map for the regular gasoline, and carries out the ignition timing control in the same manner described above, when the correction amount is corrected to be retarded with more than seven degrees.

Next, the fuel injection control will be explained. The control unit 30 determines a basic fuel injection amount based on the engine speed Ne and the intake air amount Q, and then determines a final fuel injection amount by adding various correction amounts calculated by the signals such as a signal from a water temperature sensor (not shown) to the basic fuel injection amount. The control unit 30 finally outputs a fuel injection signal to the injection valves 13 so that the final fuel injection amounts are injected.

Figure 3:
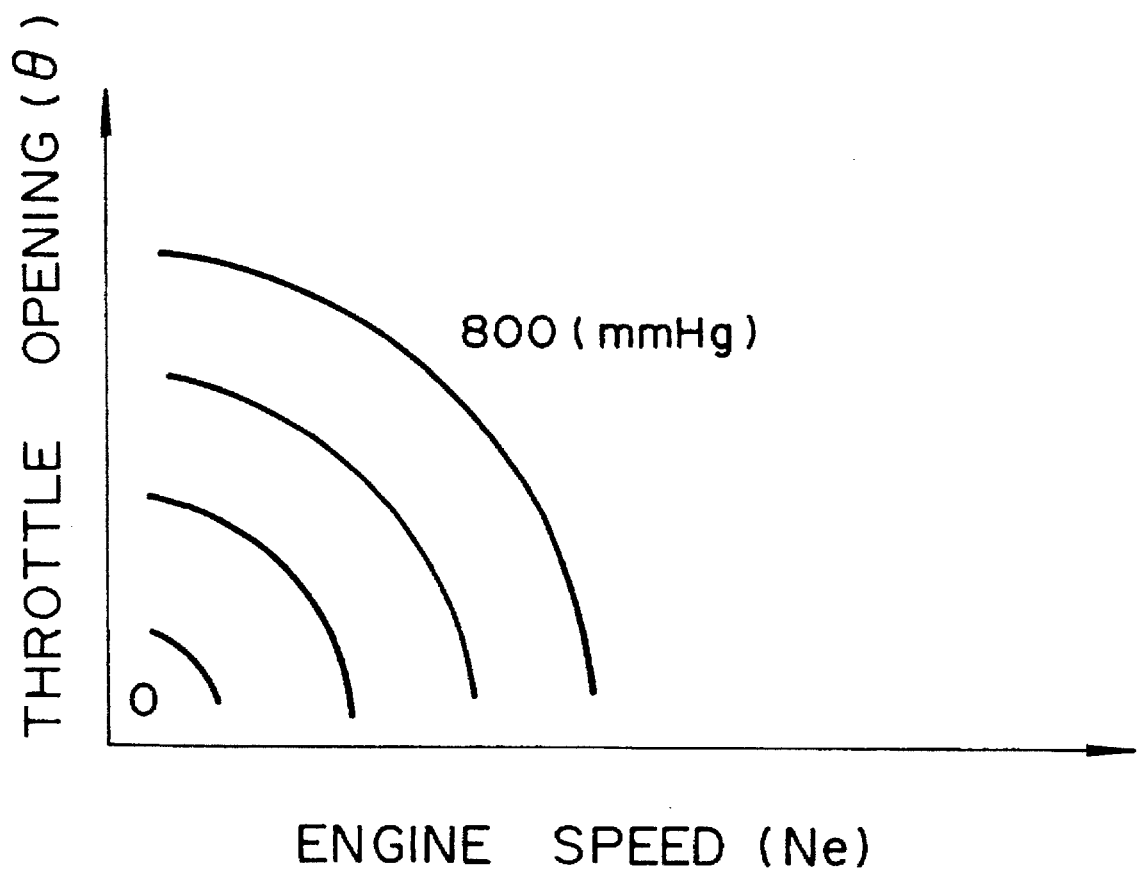
FIG. 3 is a map showing target supercharged pressures whose parameters are the engine speed (Ne) and the throttle valve opening (θ)

Next, the control of the supercharged intake air pressure will be explained. The control unit 30 determines a target supercharged pressure St by providing the actual engine speed Ne and the throttle valve opening θ to a map for target supercharged pressures whose parameters are the engine speed (Ne) and the throttle valve opening (θ) as shown in FIG. 3. Then, the control unit 30 calculates the difference delta P (=Pt–P) between the intake air pressure P detected by the pressure sensor 37 and the target supercharged intake air pressure Pt, and finally controls the opening of the air bypass valve 20 by a feedback control with a duty control so that the difference delta P becomes zero. That is, the air bypass valve 20 is operated to be closed when the actual intake air pressure P is lower than the target supercharged intake air pressure Pt, and the air bypass valve 20 is operated to be opened when the actual intake air pressure P is higher than the target supercharged intake air pressure Pt. Next, the traction control by the control unit 30 will be explained. The control unit 30 selects smaller one of the wheel speeds of the right and left rear wheels 3 and 4 or the nondriven wheels as a vehicle body speed Vr, and then calculates a vehicle body acceleration Va based on the changes in the vehicle body speed Vr. The control unit 30 further determines a road surface friction coefficient μ by applying the vehicle body speed Vr and the vehicle body acceleration Va to Table 1 which provides the road surface friction coefficient μ with parameters Vr and Va.

TABLE 1

| | Va 0 ———————→ (LARGE) | | | | | | | |
|---|---|---|---|---|---|---|---|---|
| Vr 0 ↓ (LARGE) | 1 | 1 | 2 | 2 | 3 | 3 | 4 | 4 | 5 |
| | 1 | 1 | 2 | 2 | 3 | 4 | 4 | 5 | 5 |
| | 1 | 1 | 2 | 3 | 3 | 4 | 4 | 5 | 5 |
| | 1 | 1 | 2 | 3 | 4 | 4 | 5 | 5 | 5 |
| | 1 | 1 | 2 | 3 | 4 | 5 | 5 | 5 | 5 |
| | 1 | 2 | 2 | 4 | 4 | 5 | 5 | 5 | 5 |
| | 1 | 2 | 3 | 4 | 5 | 5 | 5 | 5 | 5 |
| | 1 | 2 | 3 | 5 | 5 | 5 | 5 | 5 | 5 |

As shown in Table 1, the road-surface friction coefficient μ has a larger value, as the vehicle body speed Vr becomes larger or the vehicle body acceleration Va becomes larger.

Thereafter, the control unit 30 determines a threshold Ss for starting the traction control and a threshold Se for ending the traction control by using the vehicle body speed Vr, the road surface friction coefficient μ and a map for providing the thresholds. The threshold Se for ending the traction control is provided as a smaller value than the threshold Ss for starting the traction control.

The control unit 30 calculates slip amounts SR, SL of the right and left front wheels 1 and 2 or the driven wheels by subtracting the vehicle body speed Vr from the wheel speeds of the driven wheels 1 and 2 detected by the wheel speed sensors 31 and 32, and further determines the average slip amount SAv by arithmetical means and selects the larger one of the slip amounts SR, SL as a maximum slip amount SHi. The control unit 30 determines that the driven wheels or the right and left front wheels 1 and 2 have slipped and then sets a slip flag Fs to be one when the maximum slip amount SHi is greater than the threshold Ss for starting the traction control, and determines that the driven wheels 1 and 2 have not slipped and then resets the slip flag Ss to be zero when the maximum slip amount SHi is less than the threshold Se for ending the traction control.

The control unit 30 carries out the traction control by employing both of the engine control and the supercharged intake air pressure control.

Next, the engine control of the traction control will be explained. The control unit 30 reads out a basic target slip value for the engine control from a map whose parameters are the vehicle body speed Vr and the road surface friction coefficient μ, and then determines finally a target slip value Te for the engine control by adding necessary correction amounts. Thereafter, the control unit 30 calculates the difference delta Se between the target slip value Te and the average slip amount SAv and calculates the rate of change DSe in the difference delta Se. The control unit 30 finally reads out a basic engine control level L by applying these values of delta Se and DSe to Table 2 which shows basic engine control levels.

TABLE 2

| | | | | | DSe | | | |
|---|---|---|---|---|---|---|---|---|
| | | (−) ← | | | 0 | | → (+) | |
| | (−) | −3 | −2 | −1 | −1 | 0 | +1 | +1 |
| | ↑ | −3 | −1 | −1 | 0 | 0 | +1 | +1 |
| | | −2 | −1 | −1 | 0 | 0 | +1 | +1 |
| | | −2 | −1 | 0 | 0 | +1 | +1 | +1 |
| ΔSe | 0 | −2 | −1 | 0 | 0 | +1 | +1 | +2 |
| | | −1 | −1 | 0 | 0 | +1 | +1 | +2 |
| | | −1 | 0 | 0 | 0 | +1 | +1 | +2 |
| | ↓ | −1 | 0 | 0 | 0 | +1 | +1 | +3 |
| | (+) | −1 | 0 | 0 | 0 | +1 | +2 | +3 |

The control unit 30 substitutes the basic engine control level L read out from Table 2 for the equation (1) and then determines the engine control level EL in the scope of zero to eleven by using the result of the equation (1).

$$EL(k) = EL(k-1) + L*G \quad (1)$$

where EL(k−1) is the value in the previous cycle and G is a control gain which is provided as one in the normal condition.

The control unit 30 applies the engine control level EL obtained to Table 3 for the engine control, and carries out fuel cut operation and/or makes the ignition timing retarded based on the control operation patterns corresponding to the value of the engine control level EL.

TABLE 3

| | CYLINDER NUMBER | | | | | | RETARD |
|---|---|---|---|---|---|---|---|
| LEVEL | 1 | 2 | 3 | 4 | 5 | 6 | AMOUNT |
| PATTERNS | | | | | | | |
| 1 | | | | | | | 5° |
| 2 | | | | | | | 15° |
| 3 | * | * | | | | | |
| 4 | * | * | | | | | |
| 5 | * | * | | | | | 10° |
| 6 | * | * | * | | | | |
| 7 | * | * | * | | | | 10° |
| 8 | * | * | * | * | | | |
| 9 | * | * | * | * | | | 10° |
| 10 | * | * | * | * | * | | |
| 11 | * | * | * | * | * | * | |

The mark (*) in Table 3 means fuel cut. Therefore, the number of the cylinder in which the fuel cut is carried out increases and then the engine output is decreased as the value of the engine control level EL becomes large. The engine output is decreased more when the ignition timing is retarded even if the number of the cylinder in which the fuel cut is carried out is the same.

According to a preferred embodiment of the present invention, there are provided engine control tables including a basic table shown as Table 3, a first correction table shown as Table 4 in which the retard of the ignition timing is deleted from Table 3, a second correction table shown as Table 5 in which the control patterns are divided in five stages, and a third correction table shown as Table 6 in which the control patterns are divided in three stages.

TABLE 4

| | CYLINDER NUMBER | | | | | |
|---|---|---|---|---|---|---|
| LEVEL | 1 | 2 | 3 | 4 | 5 | 6 |
| PATTERNS | | | | | | |
| 1 | | | | | | |
| 2 | | | | | | |
| 3 | * | * | | | | |
| 4 | * | * | | | | |
| 5 | * | * | | | | |
| 6 | * | * | * | | | |
| 7 | * | * | * | | | |
| 8 | * | * | * | * | | |
| 9 | * | * | * | * | | |
| 10 | * | * | * | * | * | |
| 11 | * | * | * | * | * | * |

TABLE 5

| | | CYLINDER NUMBER | | | | | |
|---|---|---|---|---|---|---|---|
| RANK | LEVEL | 1 | 2 | 3 | 4 | 5 | 6 |
| PATTERNS | | | | | | | |
| 1 | 1 | ↓ | ↓ | ↓ | ↓ | ↓ | ↓ |
| | 2 | ↓ | ↓ | ↓ | ↓ | ↓ | ↓ |
| | 3 | * | * | | | | |
| 2 | 4 | ↓ | ↓ | ↓ | ↓ | ↓ | ↓ |
| | 5 | * | * | | | | |
| 3 | 6 | ↓ | ↓ | ↓ | ↓ | ↓ | ↓ |
| | 7 | * | * | * | | | |
| 4 | 8 | ↓ | ↓ | ↓ | ↓ | ↓ | ↓ |
| | 9 | * | * | * | * | | |
| 5 | 10 | ↓ | ↓ | ↓ | ↓ | ↓ | ↓ |
| | 11 | * | * | * | * | * | * |

TABLE 6

| | | CYLINDER NUMBER | | | | | |
|---|---|---|---|---|---|---|---|
| RANK | LEVEL | 1 | 2 | 3 | 4 | 5 | 6 |
| PATTERNS | | | | | | | |
| 1 | 1 | ↓ | ↓ | ↓ | ↓ | ↓ | ↓ |
| | 2 | ↓ | ↓ | ↓ | ↓ | ↓ | ↓ |
| | 3 | ↓ | ↓ | ↓ | ↓ | ↓ | ↓ |
| | 4 | ↓ | ↓ | ↓ | ↓ | ↓ | ↓ |
| | 5 | * | * | | | | |
| 2 | 6 | ↓ | ↓ | ↓ | ↓ | ↓ | ↓ |
| | 7 | ↓ | ↓ | ↓ | ↓ | ↓ | ↓ |
| | 8 | ↓ | ↓ | ↓ | ↓ | ↓ | ↓ |
| | 9 | * | * | * | * | | |
| 3 | 10 | ↓ | ↓ | ↓ | ↓ | ↓ | ↓ |
| | 11 | * | * | * | * | * | * |

Figure 4:
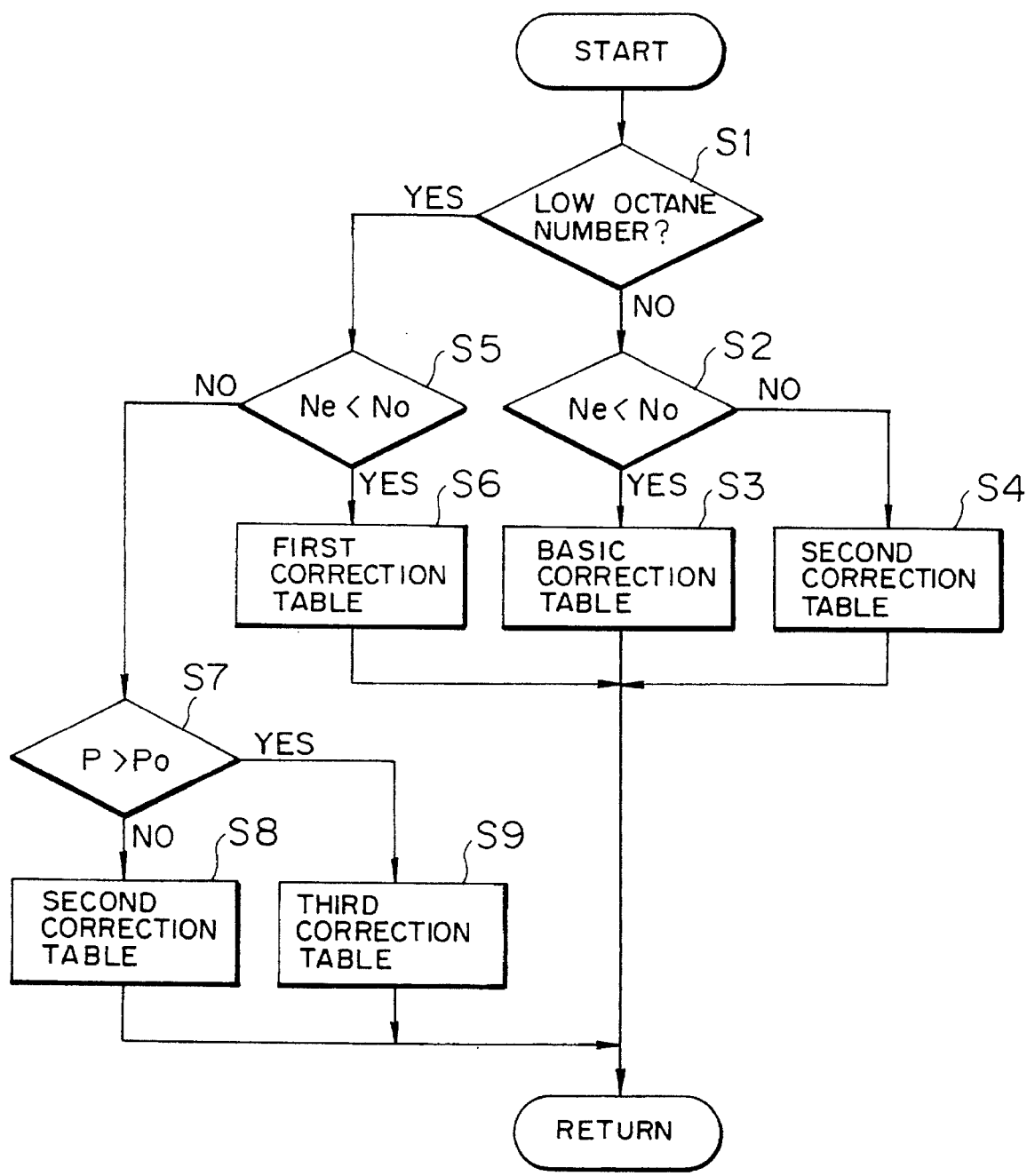
FIG. 4 is a flowchart for switching engine control tables selectively based on the driving conditions of the engine in accordance with a preferred embodiment of the present invention.

These engine control tables are switched selectively based on the driving conditions of the engine 5, as shown in FIG. 4.

Referring to FIG. 4, the control unit 30 determines whether or not the low octane number fuel has been used in step S1. That is, the control unit 30 determines that the low octane number fuel has been used when the retard amount in the correction amount becomes greater than seven degrees.

When the answer is NO in step S1 or the control unit 30 has determined that the high octane number gasoline which is designated to the engine has been used, the procedure proceeds to step S2 in which the control unit 30 determines whether or not the engine speed Ne is less than a predetermined switching speed No, for example 4000 pm. When the answer in step S2 is YES, the procedure proceeds to step S3 in which the basic table shown in Table 3 is selected as the engine control table. Therefore, for example, the fuel cut is not carried out and only the retard (15 degrees) of the ignition timing is carried out when the engine control level EL obtained by the equation (1) is two, and the fuel cut in the two cylinders is carried out when the engine control level EL is three.

When it is determined that the engine speed Ne is greater than the predetermined switching speed No in step S2, the control unit 30 selects the second correction table as shown in Table 5 in step S4. In this case, the fuel cut in the two cylinders is carried out based on the control pattern in first rank when the control level is one, two or three. That is, even if the control level one is changed to be two or three, the fuel cut in the two cylinders has been kept. When the control level three is changed to be four, the control pattern moves from first rank to second rank, and the fuel cut in the two cylinders are carried out based on the control pattern of second rank. Thus, the fuel cut is carried out based on the control patterns of first rank through fifth rank.

On the other hand, when the answer is YES, that is, it is determined that the regular gasoline has been used, the procedure proceeds to step S5 in which the control unit 30 determines whether or not the engine speed is less than the above-mentioned predetermined switching speed No. When the answer is YES in step S5, the control unit 30 selects the first correction table as shown in Table 4 in step S6. In this case, neither of the retard ignition timing the now fuel cut are carried out, when the engine control level is one or two. The fuel cut in the two cylinders is carried out, when the engine control level is three. Thus, the fuel cut is carried out based on the engine control levels of one through eleven.

When it is determined that the engine speed Ne is not less than the predetermined switching speed No in step S5, the procedure proceeds to step S7 in which the control unit 30 determines whether or not the intake air pressure P of the engine 5 is greater than a predetermined switching pressure Po. When the answer is NO in step S7, the procedure proceeds to step S8 in which the control unit 30 selects the second correction table. In this case, the fuel cut is carried out based on the control patterns of first rank through fifth rank.

When the control unit 30 determines that the intake air pressure P of the engine 5 is greater than the predetermined switching pressure Po in step S7, it selects the third correction table as shown in Table 6 in step S9. In this case, the fuel cut in the two cylinders is carried out based on the control pattern in first rank when the control level is either one of one through five. That is, even if the control level one is changed to be either one of two through five, the fuel cut in the two cylinders has been kept. When the control level five is changed to be six, the control pattern moves from first rank to second rank, and the fuel cut in the four cylinders is carried out based on the control pattern of second rank. Thus, the fuel cut is carried out based on the control patterns of first rank through third rank.

Next, the supercharged pressure control in the traction control will be explained. The control unit 30 determines the supercharging region when the intake air pressure P detected by the pressure sensor 37 is greater than the atmospheric pressure. Then, the control unit 30, in the supercharging region, controls the opening of the air bypass valve 20 by feedback control based on the intake air pressure p detected by the pressure sensor 37 so that the intake air pressure P is equal to the target supercharged pressure pt. The target supercharged pressure P is read out from the map shown in FIG. 3 by using the detected engine speed Ne and the throttle opening θ.

In addition to the above-mentioned control, the control unit 30 reads out a basic target slip amount for the supercharged pressure control from a map whose parameters are the vehicle body speed Vr and the road surface friction coefficient μ, and finally provides a target slip amount Tb for the supercharged pressure control by adding necessary correction amount to the basic target slip amount. Next the control unit 30 calculates the average slip amount SAv based on the target slip amount Tb, and further calculates the difference delta Sb between the target slip amount Tb and the average slip amount SAv and the rate of change DSb in the difference delta Sb. Thereafter, the control unit 30 applies these values to Table 7 in order to obtain control levels each of which represents the operation speed of the air bypass valve 20. The control unit 30 finally provides actual operation speed (unit: %/sec.) of the air bypass valve 20 by referring the control level in Table 7 to Table 8.

TABLE 7

|  | DSb | | | | | | |
| --- | --- | --- | --- | --- | --- | --- | --- |
|  | (−) ← | | 0 | | → (+) | | |
| (−) | NB | NB | NB | NB | NM | ZO | ZO |
| ↑ | NM | NM | NM | NM | NS | ZO | ZO |
|  | NM | NM | NM | NS | ZO | ZO | ZO |
| ΔSb 0 | NS | NS | NS | ZO | ZO | ZO | ZO |
|  | ZO | ZO | ZO | ZO | PS | PS | PS |
| ↓ | ZO | ZO | PS | PM | PM | PM | PM |
| (+) | ZO | ZO | PM | PB | PB | PB | PB |

TABLE 8

| CONTROL LEVEL | NB | NM | NS | ZO | PS | PM | PB |
| --- | --- | --- | --- | --- | --- | --- | --- |
| SPEED | −8 | −5 | −2 | 0 | +2 | +5 | +10 |

In Tables 7 and 8, the symbol ZO stands for the valve opening being maintained, the symbol N stands for the valve being operated to be closed, and the symbol P stands for the valve being operated to be opened. The subscripts S, M and B of the symbols N and P stand for the amounts of the control operation and represent respectively a small amount, a medium amount and a large amount. Thus, when PB is selected as the control level, the air bypass valve 20 is operated to be opened with a maximum speed (10%/sec.). When the air bypass valve 20 is fully opened, the valve opening is 100%.

Figure 5:
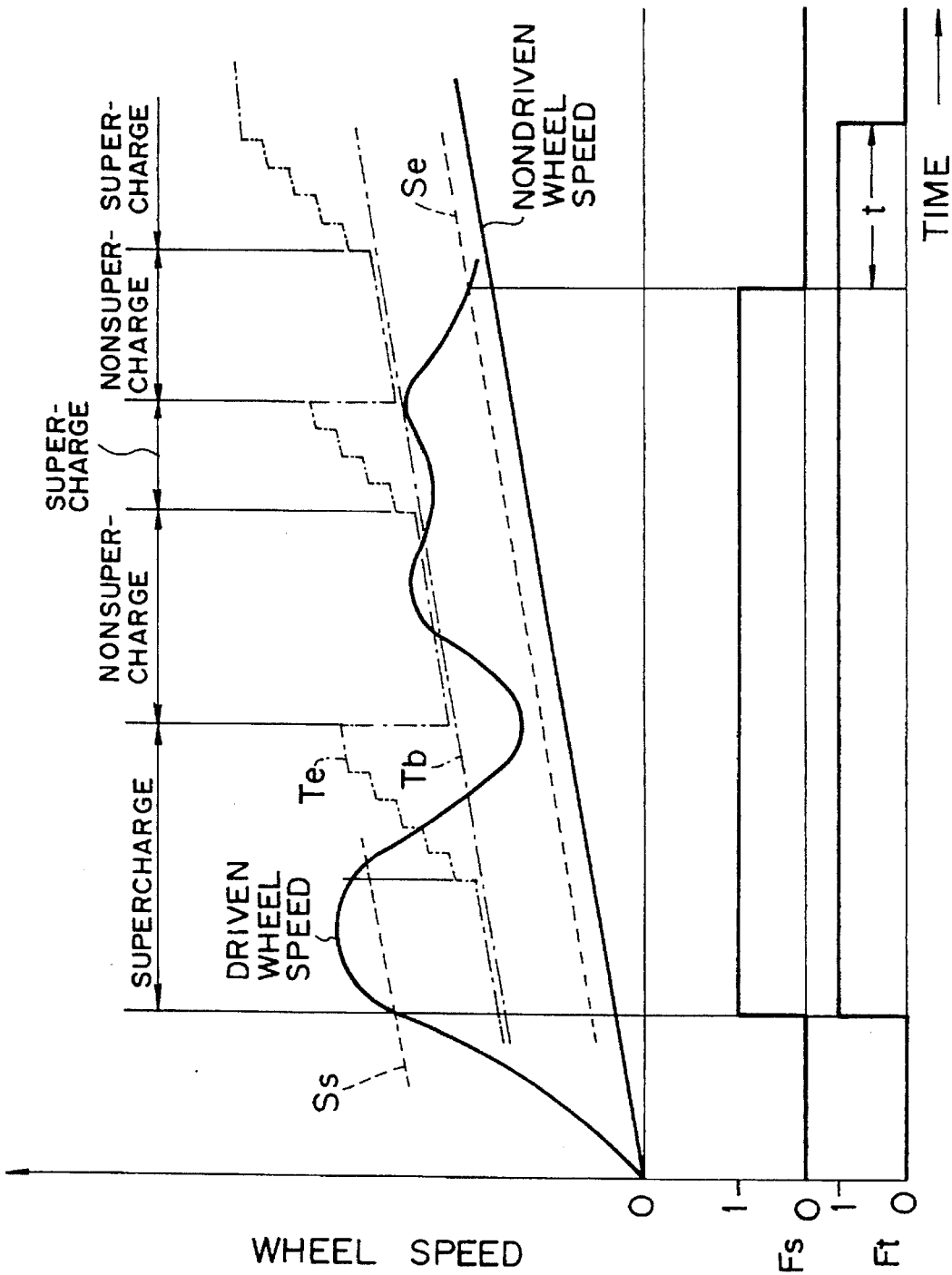
FIG. 5 is a time chart showing the traction control in accordance with a preferred embodiment of the present invention.

In operation, as shown in FIG. 5, when the maximum slip amount SHi of the driven wheel first exceeds the threshold Ss for starting the traction control in the supercharging region, the control unit 30 sets a slip flag Fs to be one and starts the traction control by carrying out both of the engine control and the supercharged pressure control. At the same time, the control unit 30 sets a traction flag Ft to be one which represents that the traction control has been carried out, and lights the lamp 27. The target slip amount Te for the engine control and the target slip amount Tb for the supercharged pressure control are provided as the substantially same amount shortly after the traction control has started. Therefore, the engine control and the supercharged pressure control are carried out simultaneously. At this time, when the high octane number gasoline which is designated to the engine is actually used and the engine speed Ne is less than the switching speed No, the control unit 30 selects the basic table as shown in Table 3. Since the engine 5 is controlled in detail with the fuel cut and the retard of ignition timing in accordance with the control levels one through eleven in the basic table, the excessive slip in the first spin can be decreased rapidly. In this case, since the exhaust gas discharged from the respective cylinders of the banks 5a and 5b takes a relatively long time period to travel to the catalytic converter 25, the catalytic converter 25 radiates the heat generated by the oxidation of hydrocarbons to the circumference.

On the contrary, when the engine speed Ne is greater than the switching speed No, the control unit 30 selects the second correction table as shown in Table 5. In this case, since the retard of ignition timing is stopped and the fuel cut in the two cylinders is carried out even if the control level is one or two, the amount of unburned hydrocarbons in the exhaust gas flown into the catalytic converter 25 per unit time is decreased. As a result, the oxidation of unburned hydrocarbons in the catalytic converter 25 is decreased and the abnormal rise of temperature in the converter 25 can be avoided.

At a predetermined timing at which the wheel speed of the driven wheel has started to decrease after the maximum speed, the target amount Te for the engine control is increased stepwise to a predetermined amount. As a result, the engine control level EL moves to "zero" immediately, and therefore only the supercharged pressure control is carried out. This can avoid the abnormal rise of temperature in the catalytic converter 25.

Since the target slip amount Te for the engine control is increased stepwise to the predetermined amount, if a large slip occurs again after the first spin has been decreased, such large slip can be decreased immediately by the engine control in addition to the supercharged pressure control if the large slip is greater than the target slip amount Te for the engine control.

When the condition moves from the supercharging region to the nonsupercharging region, the target slip amount Te for the engine control is decreased at a stroke near to the target slip amount Tb for the supercharged pressure control.

Only the engine control is carried out in the nonsupercharging region. Where the slip amount in the driven wheel is decreased by the engine control and the engine control level EL becomes zero, the engine output increases based on the throttle opening θ. Thereafter, the condition moves to the supercharging region.

After the condition moves from the nonsupercharging region to the supercharging region, the target slip amount Te is increased stepwise to a predetermined amount. Thus, the engine control level EL moves to "zero" immediately and therefore only the supercharged pressure control is carried out.

The above-mentioned controls are carried out repeatedly. When the maximum slip amount SHi becomes less than the threshold Se for ending the traction control, the control unit 30 resets the slip flag Fs to be one. Thereafter, when a predetermined time period t has passed, the control unit 30 resets the traction flag Ft to be zero in order to end the traction control.

On the other hand, suppose that the regular gasoline has been used in the engine 5 instead of the designated high octane number gasoline. In this case, as shown in FIG. 5, when the maximum slip amount SHi in the driven wheel first exceeds the threshold Ss for starting the traction control in the supercharging region, both of the engine control and the supercharged pressure control of the traction control are carried out simultaneously. At this time, when the engine speed Ne is less than the switching speed No, the control unit 30 selects the first correction table as shown in Table 4 in which only the fuel cut is carried out. As a result, even if a second map for ignition timing in which the ignition timing is provided in a retard direction more than that in a first map for ignition timing for high octane number gasoline, the final ignition timing is not retarded excessively. Therefore, the unburned hydrocarbons in the exhaust gas do not increase and as a result the oxidation of hydrocarbons in the catalytic converter 25 is restrained. Finally, the abnormal rise of the temperature in the catalytic converter 25 can be avoided.

On the contrary, when the engine speed Ne is greater than the switching speed No, the control unit 30 selects the second correction table as shown in Table 5 or the third correction table as shown in Table 6 based on the supercharged pressure in the engine 5.

Namely, when the intake air pressure P is less than the switching pressure Po, the second correction table is selected. In this case, since the fuel cut in the two cylinders is carried out even if the control level EL is one or two, the amount of unburned hydrocarbons in the exhaust gas flown into the catalytic converter 25 per unit time is decreased. As a result, the oxidation of unburned hydrocarbons in the catalytic converter 25 is restrained slightly and the abnormal rise of the temperature in the catalytic converter 25 can be certainly avoided.

On the other hand, when the intake air pressure P is greater than the switching pressure Po, the third correction table is selected. In this case, since the number of the cylinders in which the fuel cut is carried out becomes larger than the case using the second correction table even if the engine control level EL is same, the amount of unburned hydrocarbons in the exhaust gas flown into the catalytic converter 25 per unit time is decreased much more. As a result, even if the supercharged pressure is high and therefore a large amount of air is supplied to the engine 5, the oxidation of hydrocarbons in the catalytic converter 25 is restrained greatly and the abnormal rise of the temperature in the catalytic converter 25 can be much more certainly avoided.

The embodiment of the present invention explained above is applied to the motor vehicle having the engine with the supercharger in which the high octane number gasoline is designated. The present invention may apply to the motor vehicle having the engine without the supercharger in which the high octane number gasoline is designated and may also applies the motor vehicle having the engine with the supercharger in which the regular gasoline is designated.

The present invention has been described with reference to the preferred embodiments thereof which are intended to be illustrative rather than limiting. Various changes in modifications may be made without departing from the spirit and scope of the present invention in the following claims.

What is claimed is:

1. A traction control system for a motor vehicle having an engine with a catalytic converter in an exhaust path, said traction control system comprising:

wheel speed sensors for detecting wheel speeds of respective wheels;

engine output controlling means for controlling an engine output; and control means for (1) calculating slip amounts of driven wheels based on the wheel speeds, (2) operating said engine output controlling means to decrease engine output based on predetermined engine output decreasing patterns which correspond to the slip amounts, (3) determining an octane number of fuel supplied to the engine and detecting a difference between said octane number and a predetermined octane number, and (4) changing an engine output decreasing pattern so as to decrease an amount of unburned hydrocarbons in exhaust gas supplied to the catalytic converter when the octane number of the fuel supplied to the engine is smaller, by a predetermined number, than the predetermined octane number.

2. A traction control system according to claim 1, and further comprising means for detecting engine speed, said control means changing the engine output decreasing pattern so as to decrease the amount of unburned hydrocarbons when the engine speed is greater than a predetermined value.

3. A traction control system according to claim 1, wherein said engine includes a plurality of cylinders, and further comprising fuel injection means for supplying fuel to said cylinders, said control means operating said fuel injection means so as to cut fuel supplied to predetermined cylinders of said plurality of cylinders independent of retard correction of ignition timing.

4. A traction control system according to claim 1, wherein said engine has a supercharger.

5. A traction control system for a motor vehicle having an engine with a catalytic converter in an exhaust path and a supercharger, said system comprising:

wheel speed sensors for detecting wheel speeds of respective wheels;

slip amount detection means for calculating slip amounts in driven wheels based on wheel speeds;

engine output controlling means for decreasing engine output based on predetermined engine output decreasing patterns which correspond to the slip amounts;

means for detecting supercharged pressure in the engine; and means for changing the engine output decreasing pattern so as to decrease unburned hydrocarbons in the exhaust gas flown into the catalytic converter when the supercharged pressure in the engine is greater than a predetermined value.

6. A traction control system according to claim 5, and further comprising means for detecting a difference between an octane number of fuel supplied to the engine and a predetermined octane number, and wherein said means for changing the engine output decreasing pattern changes the engine output decreasing pattern so as to decrease the amount of unburned hydrocarbons when the octane number is smaller, by more than a predetermined number, than the predetermined octane number.

7. A traction control system according to claim 5, and further comprising means for detecting engine speed, wherein said means for changing the engine output decreasing pattern changes the engine control pattern so as to decrease the amount of unburned hydrocarbons when the engine speed is greater than a predetermined value.

8. A traction control system according to claim 7, wherein said engine includes a plurality of cylinders, and further comprising fuel injection means for supplying fuel to said cylinders, said means for changing the engine output decreasing pattern changing said pattern by cutting fuel supplied to predetermined cylinders of said plurality of cylinders independent of retard correction of ignition timing.

9. A traction control system according to claim 7, and further comprising means for detecting a difference between an octane number of fuel supplied to the engine and a predetermined octane number, wherein said means for changing the engine output decreasing pattern (1) changes the engine output decreasing pattern so as to decrease the unburned hydrocarbons when the octane number of the fuel supplied to the engine is smaller, by more than a predetermined number, than the predetermined octane number and the engine speed is greater than the predetermined value, and (2) changes the engine control pattern so as to further decrease the unburned hydrocarbons when the supercharged pressure is greater than a predetermined pressure.

10. A traction control system for a motor vehicle having an engine with a catalytic converter in an exhaust path, said traction control system comprising:

an engine speed sensor for detecting an engine speed;

engine output controlling means for controlling an engine output;

control means for (1) determining an octane number of fuel supplied to the engine and detecting when a low octane fuel is used, (2) operating said engine output controlling means in accordance with a basic correction pattern when the low octane fuel is not used and said engine speed sensor detects an engine speed below a predetermined engine speed, and (3) operating said engine output controlling means in accordance with another correction pattern when the low octane fuel is used.

11. A traction control system according to claim 10, wherein said control means operates said engine output controlling means in accordance with a first other correction pattern when the low octane fuel is used and the engine speed is below the predetermined engine speed.

12. A traction control system according to claim 11, and further comprising pressure sensing means for detecting intake air pressure in an engine air intake.

13. A traction control system according to claim 12, wherein said control means operates said engine output controlling means in accordance with a second other correction pattern when the low octane fuel is not used and the engine speed is not below the predetermined engine speed.

14. A traction control system according to claim 13, wherein said control means operates said engine output controlling means in accordance with said second other correction pattern when the low octane fuel is used, the engine speed is not below the predetermined engine speed and the intake air pressure detected by the sensing means is greater than a predetermined switching pressure.

15. A traction control system according to claim 14, wherein said control means operates said engine output controlling means in accordance with a third other correction table when the low octane fuel is used, the engine speed is not below the predetermined engine speed and the intake air pressure is not greater than the predetermined switching pressure.

16. A traction control system according to claim 10, wherein said control means further performs an ignition timing control according to a first control map when the low octane fuel is not used and according to a second control map, having a retarded ignition timing as compared to the first control map, when the low octane fuel is used.

17. A traction control system according to claim 11, wherein said control means further performs an ignition timing control according to a first control map when the low octane fuel is not used and according to a second control map, having a retarded ignition timing as compared to the first control map, when the low octane fuel is used.

18. A traction control system according to claim 12, wherein said control means further performs an ignition timing control according to a first control map when the low octane fuel is not used and according to a second control map, having a retarded ignition timing as compared to the first control map, when the low octane fuel is used.

19. A traction control system according to claim 13, wherein said control means further performs an ignition timing control according to a first control map when the low octane fuel is not used and according to a second control map, having a retarded ignition timing as compared to the first control map, when the low octane fuel is used.

20. A traction control system according to claim 15, wherein said control means further performs an ignition timing control according to a first control map when the low octane fuel is not used and according to a second control map, having a retarded ignition timing as compared to the first control map, when the low octane fuel is used.

* * * * *